United States Patent [19]

Blomberg

[11] 4,253,311

[45] Mar. 3, 1981

[54] CONTROL SYSTEM FOR A MOBILE ABSORPTION REFRIGERATING APPARATUS

[75] Inventor: Peter E. Blomberg, Stockholm, Sweden

[73] Assignee: Aktiebolaget Electrolux, Stockholm, Sweden

[21] Appl. No.: 49,459

[22] Filed: Jun. 18, 1979

[30] Foreign Application Priority Data

Jun. 19, 1978 [SE] Sweden ................. 7806990

[51] Int. Cl.³ ................. F25B 15/00; F25B 27/00; B60H 3/04
[52] U.S. Cl. ................. 62/148; 62/236; 62/239; 62/476
[58] Field of Search ................. 62/148, 236, 238 B, 62/239, 476; 219/279

[56] References Cited

U.S. PATENT DOCUMENTS

| | | | |
|---|---|---|---|
| 3,105,363 | 10/1963 | Von der Scher | 62/148 |
| 3,177,677 | 4/1965 | Boren et al. | 62/148 X |
| 3,253,421 | 5/1966 | Grubb | 62/148 |
| 3,648,481 | 3/1972 | Ando et al. | 62/236 |
| 3,749,307 | 7/1973 | Odashima et al. | 62/148 X |
| 3,810,249 | 5/1974 | McGowan | 62/148 |
| 3,875,369 | 4/1975 | Sellerstam | 62/236 |

*Primary Examiner*—Lloyd L. King
*Attorney, Agent, or Firm*—Alfred E. Miller

[57] ABSTRACT

In a mobile absorption refrigeration system wherein the refrigerator has at least one electric heater and a gas burner, the refrigeration system is connected to a vehicle by way of a separable plug assembly which includes one circuit for supplying electric power to the heater, and a control arrangement disabling the gas heater as long as the electric power source of a towing vehicle is connected to the refrigeration system.

8 Claims, 3 Drawing Figures

CONTROL SYSTEM FOR A MOBILE ABSORPTION REFRIGERATING APPARATUS

This application is related to co-pending application Ser. No. 84,877 filed Oct. 15, 1979.

This invention relates to a control system in a towing car and trailer, the latter having a refrigerator with absorption refrigerating apparatus operated by several heat sources which can be connected alternatively and comprise at least one electric heat source and one gas burner, a control system with an electric circuit through a battery being included to ignite a gas flame in the burner and to maintain the flame when the electric heat source is inactive.

When trailer and towing car are moving, one electric heating unit supplies energy from the generator of the car to the refrigerating apparatus. When the trailer is parked and the towing car is not coupled to it, energy can be supplied either from an electric mains supply to another electric heating unit in the refrigerating apparatus or from a supply of gas to a gas burner.

It has earlier been proposed to equip an absorption refrigerating apparatus having two or three alternatively operating heat sources with a control system which automatically maintains a single one of the alternative heat sources in operation. Another feature of the system is that it gives priority to electric operation, if such energy is available. Further, this system provides automatic enabling of the gas burner if electric connection is not available or current is not supplied by such a connection.

When towing car and trailer are moving, the refrigerator is operated by electric energy supplied by the generator of the towing car. It is possible, however, that the generator is occasionally inactive. This occurs, for example, when the vehicle has stopped in a service station for filling. On such occasions it is desired to prevent starting of the control system by which a gas flame at the burner would be lighted. The object of this invention is to provide a system preventing this, and for this purpose the invention is generally characterized in that the coupling members between towing car and trailer include means which when joined break the electric circuit in the control system of the gas burner and when disengaged close this circuit.

In order that the invention will be more clearly understood, it will now be disclosed in greater detail with reference to the accompanying drawings, wherein.

Figure 1:
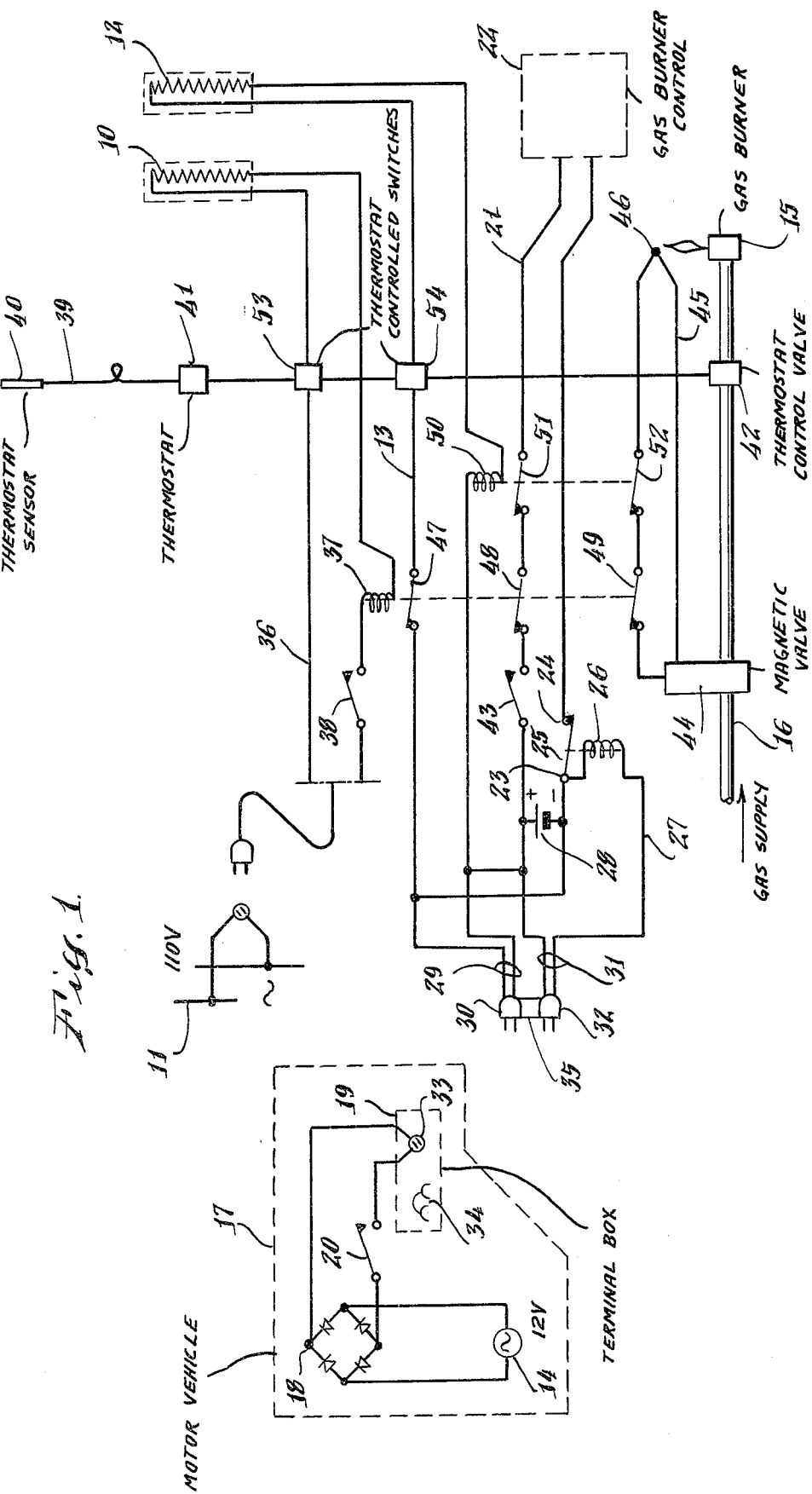
FIG. 1 is a circuit diagram of the heat supply control of a mobile absorption.
Figure 2:
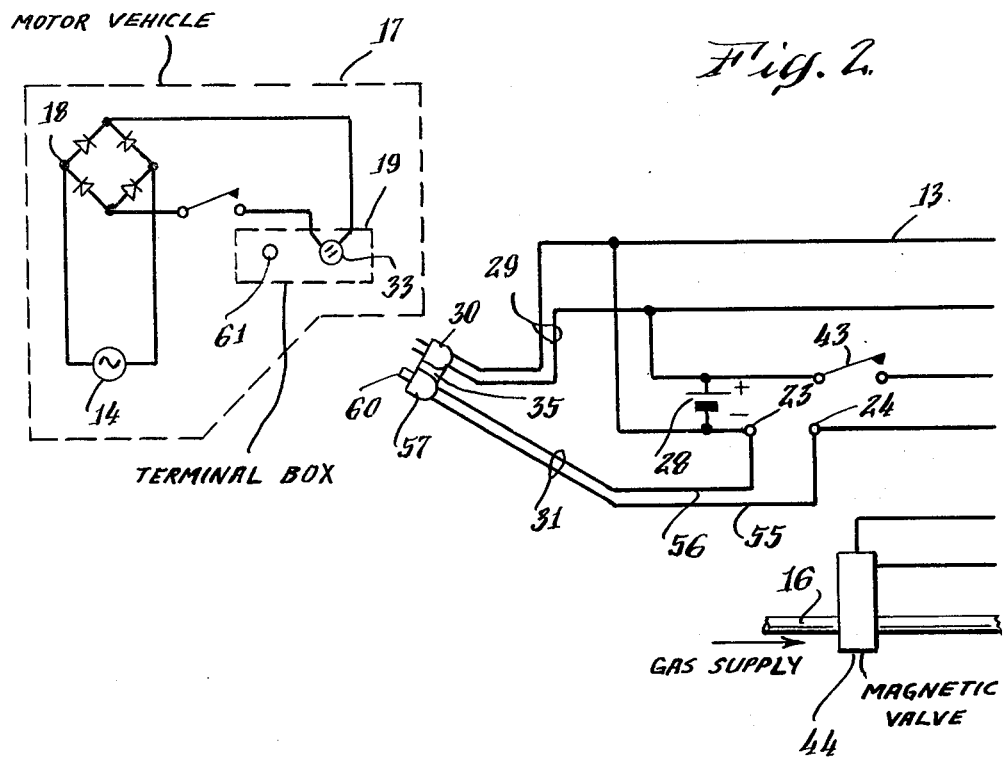
FIG. 2 is a circuit diagram of a modification of the system of FIG. 1.

Referring to FIG. 1, an absorption refrigerating apparatus can be operated alternatively by an electric heating unit 10 connectable to an electric mains supply 11, by a second electric heating unit 12 connectable by a circuit 13 to an alternator 14, or by a gas burner 15 to which gas from a gas supply is supplied by way of a conduit 16. Those parts of the device which are in the towing car are shown in FIGS. 1 and 2 in a dashed box 17 and comprise the alternator 14 connected to a rectifier 18, and a terminal box 19, connected to the rectifier 18 by the ignition key switch 20 of the towing car.

In a control circuit 21 for control means 22 of the gas burner 15 an interruption is made between two points 23 and 24. At this location a contact 25 is provided which is controlled by a relay 26. The relay is in a circuit 27 connected to a battery 28. Of course, a separate battery can be provided on the towing car and supplied by the alternator 14, but since this is of no relevance to the present invention it has not been shown in the Figures.

The circuit 13 is connected by a cable 31 to a plug 32. In the terminal box 19 in the towing car, a socket 33 is provided for the plug 30 of the circuit 13 and short-circuiting means 34 is provided for the plug 32. The two plugs 30 and 32 are shown as being mechanically interconnected by a bridge 35, but they can also form an integral part so that both have to be connected simultaneously to the terminal box 19.

In FIG. 1, the device is shown in a position in which the trailer is separated from the towing car. If a circuit 36 to the heating unit 10 is plugged into the mains supply 11, the refrigerator will operate with the unit 10 as heating source. At this time a coil 37 is energized and breaks the control circuit 21 via contact 48 so that the control means 22 of the gas burner 15 cannot operate.

If the electric operation through the circuit 36 is discontinued for example by a switch 38, the circuit 21 may become active and be energized by the battery 28 via the manually operable switch 43. The switch 25 is connected to be closed when the circuit through the cable 31 is broken. The control means 22 provides for ignition of the gas flame, and the control thereof in dependence on a thermostat system 39, 40, 41, 42.

When the trailer is coupled to the towing car, the plugs 30 and 32 are connected to the terminal box 19 of the towing car. If the alternator 14 is in operation, current flows in the circuit 13 to the heating unit 12. At the same time, the circuit 27 is connected through the battery 28 and the relay 26 is energized and breaks the circuit 21 through the switch 25. Even if now the alternator 14 is stopped or the unit 12 does not receive current for some other reason, the circuit 21 and the control means 22 cannot operate and ignite the gas flame.

In order to enable the refrigerator to operate by gas also when the vehicles are coupled together and the contact 25 is open, a manually operable switch (not shown) can be provided in the circuit 27 in shunt with the contact 25. A manually operable switch 43 is disposed in the circuit 21.

The gas supply conduit 16 has in known manner a safety device comprising a magnetic valve 44, whereby a circuit 45 is connected to thermocouples 46 at the burner 15.

As discussed above, the circuit 36 includes a coil 37. When the latter is energized it disconnects contacts 47 in the control circuit 21 and contacts 49 in the safety device 44, 45, 46.

The circuit 13 includes a relay 50 which breaks the circuits 21 and 45 via contacts 51, 52.

The thermostat 41 not only controls the gas operation by the thermostat valve 42 but also controls the electric heat supply by means of switches 53, 54.

Figure 3:
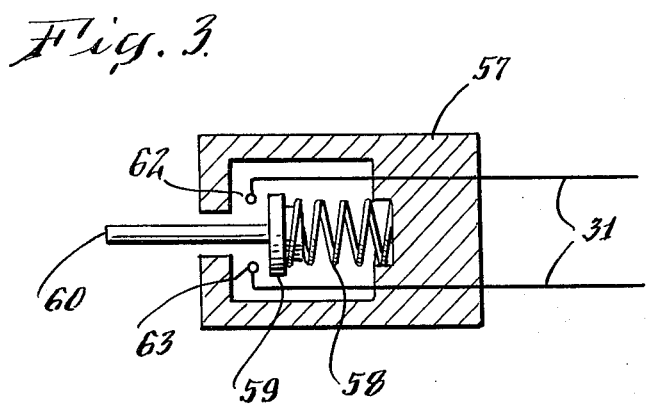
FIG. 3 is a cross-sectional view of a plug that may be employed in the system of FIG. 2.

In the embodiment shown in FIGS. 2 and 3 the switch 25 with the relay 26 and the short-circuiting means 34 of the plug 32 are replaced by other parts. The cable 31 has two connections, one connection 55 to the point 24 and another connection 56 to the point 23. A plug 57 at the cable 31 has a contact arm 59 with a projecting stub 60 loaded in the switched-in position by a spring 58. The terminal box 19 has a guide hole 61 for the stub 60.

When the contacts 30 and 57 are pushed into the sockets 33, 61, the stub 60 is pressed against the spring 58 and the contact arm 59 does not bridge contacts 62, 63 in the circuit 31 so that the current in the control circuit 21 is broken.

Although the invention has been disclosed and described with reference to several embodiments, it will be apparent that many variations and modifications thereof are possible, and it is therefore intended in the following claims to cover each such variation and modification as falls within the true spirit and scope of the invention.

What is claimed is:

1. In a control system for an absorption refrigeration apparatus having a first electric heating means, gas heating means, and a gas control means for controlling said gas burner means, said gas control means including an electric circuit for igniting and maintaining a flame in said gas burner means; the improvement wherein said control system further comprises a readily separable electrical connector assembly coupled to said electric heating means for energizing said electric heating means from an external source, and means responsive to the separation of said electrical connector assembly and connected to said gas control means for enabling ignition and maintenance of a flame in said gas burner means.

2. The control system of claim 1 in which said absorption refrigeration apparatus is a mobile apparatus and said electrical connector assembly is mountable on a towing vehicle for supplying electric current to said first heating means from the electric system of said towing vehicle, wherein said electrical connector assembly further comprises an electric connection responsive to the separation of said electric assembly for enabling said gas control means.

3. The control system of claim 2 wherein said electric circuit includes a battery enabling operation of said gas control means, and a relay having contacts for connecting said battery to said gas control means, said relay being connected to said electric connection for enabling the interconnection of said battery and gas control means only when said electrical connector assembly is unconnected.

4. The control system of claim 3 wherein said electric connector assembly includes a link connectable to said electric connection for enabling energization of said relay only when said connector assembly is connected.

5. The control system of claim 2 wherein said electric circuit further includes a battery for supplying operating current for said gas control means, and said electric connection includes a switch responsive to separation of said electric connector assembly for directly interconnecting said battery and electric circuit.

6. The control system of claim 2 wherein said absorption refrigeration apparatus further includes a second electric heating means, a power circuit for interconnecting said second electric heating means to an electric means supply, and relay means operative upon the application of power to said second electric heating means for interrupting the current flow path of said first electric heating means and for disabling said electric circuit.

7. The control system of claim 1 wherein said means responsive to separation of said electric connector assembly comprises a switch in said electric connector assembly.

8. The control system of claim 1 wherein said means responsive to the separation of said electric connector assembly comprises a separable electric link in said connector assembly.

* * * * *